Dec. 5, 1967   W. H. HERSCOVITCH   3,356,042
CONVERTIBLE RAIL-HIGHWAY VEHICLE
Filed March 30, 1965   3 Sheets-Sheet 1

INVENTOR
WILLIAM H. HERSCOVITCH
BY
Woodhams, Blanchard and F Lynn
ATTORNEY

Dec. 5, 1967 W. H. HERSCOVITCH 3,356,042
CONVERTIBLE RAIL-HIGHWAY VEHICLE
Filed March 30, 1965 3 Sheets-Sheet 3

INVENTOR
WILLIAM H. HERSCOVITCH
BY
ATTORNEY

United States Patent Office 3,356,042
Patented Dec. 5, 1967

3,356,042
CONVERTIBLE RAIL-HIGHWAY VEHICLE
William H. Herscovitch, 12 Bredenbek Strasse,
2 Hamburg-Ohlstedt, Germany
Filed Mar. 30, 1965, Ser. No. 443,952
Claims priority, application Great Britain, Apr. 2, 1964,
13,716/64
9 Claims. (Cl. 105—215)

ABSTRACT OF THE DISCLOSURE

A road-rail vehicle having a first pair of support wheels adapted to rollingly engage either the ground or a pair of parallel rail members. A second pair of support wheels is rollingly engageable with the rail members when the vehicle is used as a rail vehicle. A third pair of retractable and steerable wheels are extendable to rollingly engage the ground, when the vehicle is used as a conventional road vehicle, at which time the second pair of support wheels is held out of engagement with the ground. A lift device engages the ground to lift the vehicle completely out of engagement therewith, whereby the vehicle can be pivoted into a position wherein the first and second pairs of wheels are aligned with the rails. In positioning the vehicle upon the rails, the third pair of steerable wheels is alternately extended and retracted to lift the second pair of wheels over the individual rail members.

---

The invention relates to a road/rail tractor primarily for spotting railway vehicles in railway goods yards, the device being operable on or off rails.

In the past, railway vehicles at sidings were moved or spotted over short distances by means of pinch bars, teams of horses, tractors fitted with nose buffers or shunting locomotives. Various single, two and four wheel machines have also been used. These were generally powered by electric or gasoline operated rope winches or capstans. All these previous methods and devices suffer from a number of technical and economic disadvantages.

The accurate spotting of railway vehicles requires a tractor capable of yielding a tractive effort of up to 100 lbs. per gross ton in order to cope with the most difficult rail conditions which include small radii curves and steep gradients.

The following characteristics and features are also desirable in a spotting device:

(1) Adequate loading must be provided on the driving wheels of the devices in order to utilize the available tractive effort without wheel slip.

(2) Simple means of attachment to the railway vehicle to be moved.

(3) Stability on track curves, points and crossings.

(4) Ease of removal and replacement of the device off and onto the track.

(5) Effective in extreme climatic conditions of snow, ice, floods and the like.

(6) Inexpensive in initial cost and in subsequent running and maintenance.

It is among the objects of the invention to provide a spotting device primarily for rail vehicles which has the above capability and characteristics.

According to the invention a road/rail tractor including two sets of driving wheels, at least one retractable steering wheel capable on extension of lifting one set of driving wheels clear of the ground, and an extendable lift footing for simultaneously raising both sets of driving wheels clear of the ground and on which, when the footing is extended the tractor is pivotable.

The driving wheels of the tractor may have retractable guide wheels which serve as flanges mounted adjacent the driving wheels to permit removal of the tractor from the rails if desired. The tractor may also include means for assuming part of the load, comprising an hydraulic jacking system adapted to engage a cross beam under part of the vehicle to be moved.

The invention further comprises those features of construction hereinafter described with reference to the accompanying diagrammatic drawings which show one construction according to the invention.

Figure 1:
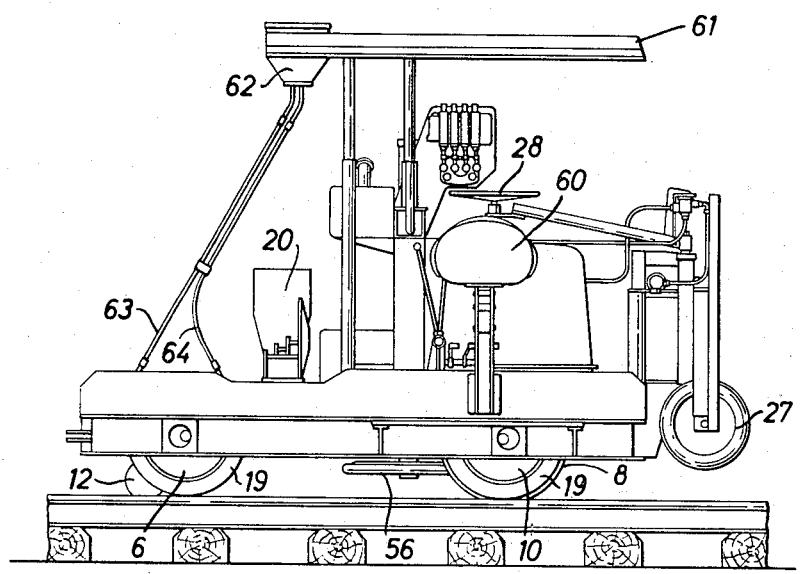
FIGURE 1 is a side elevation of a road/rail tractor according to the invention.

Referring to the drawings a road/rail tractor comprises a rectangular chassis consisting of a pair of side members 1, 2 and a pair of end members 3, 4, all of which are steel channel-section girders. Mounted in the chassis is a first pair of driving wheels 5 and 6 and a second pair of driving wheels 9 and 10. The pair of driving wheels 9 and 10 are each provided with a steel flange 7 and 8 respectively whereby the wheels are adapted to run on rails. The pair of driving wheels 5 and 6 are each provided with a guide wheel 11 and 12 respectively, the guide wheels being retractable into or out of contact with the ground so that when the guide wheels are in their lowermost position, they serve as flanges so that the driving wheels are capable of running on rails. Alternatively, when the guide wheels are retracted out of contact with the ground the driving wheels are then adapted for operation on for example a road. Preferably both pairs of driving wheels are provided with solid synthetic or natural rubber tyres 19.

Figure 2:
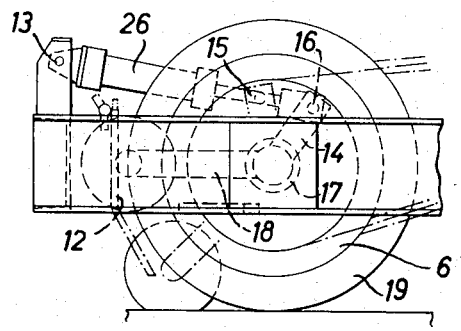
FIGURE 2 is a fragmentary side elevation showing a guide wheel and the actuating mechanism therefor.
Figure 3:
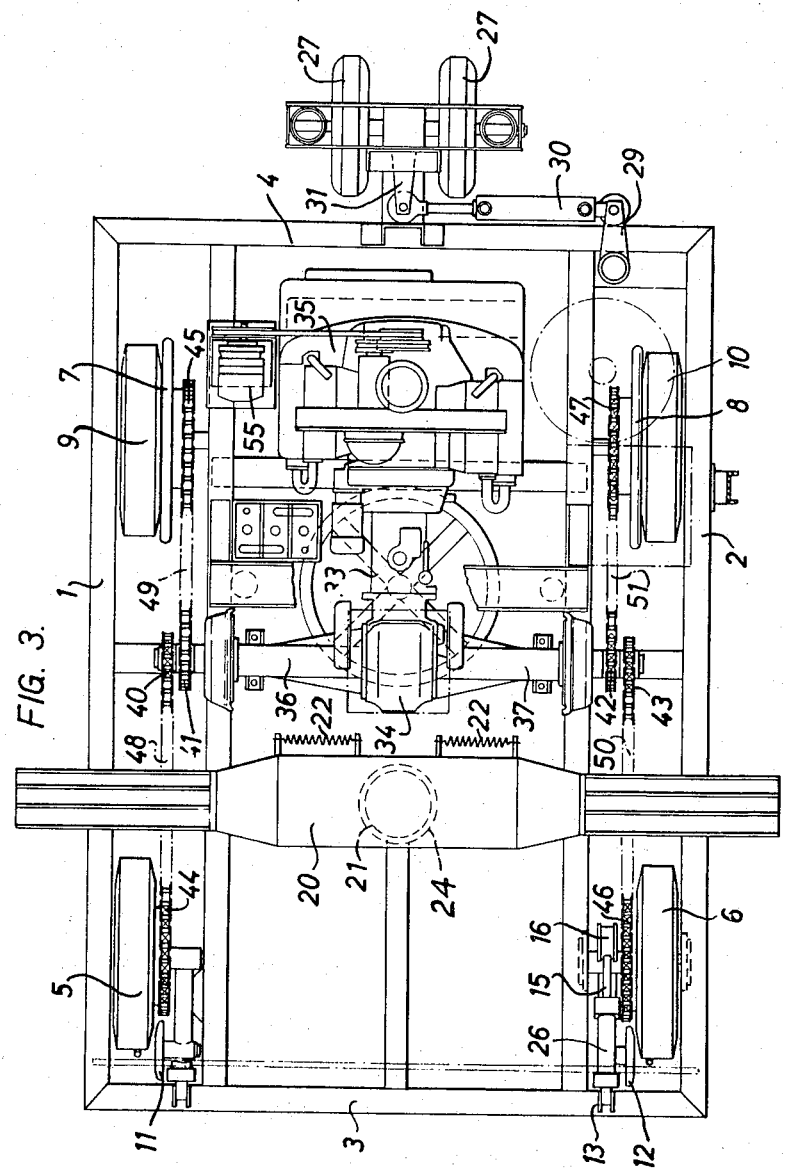
FIGURE 3 is a plan view of the apparatus illustrated in FIGURE 1.
Figure 4:
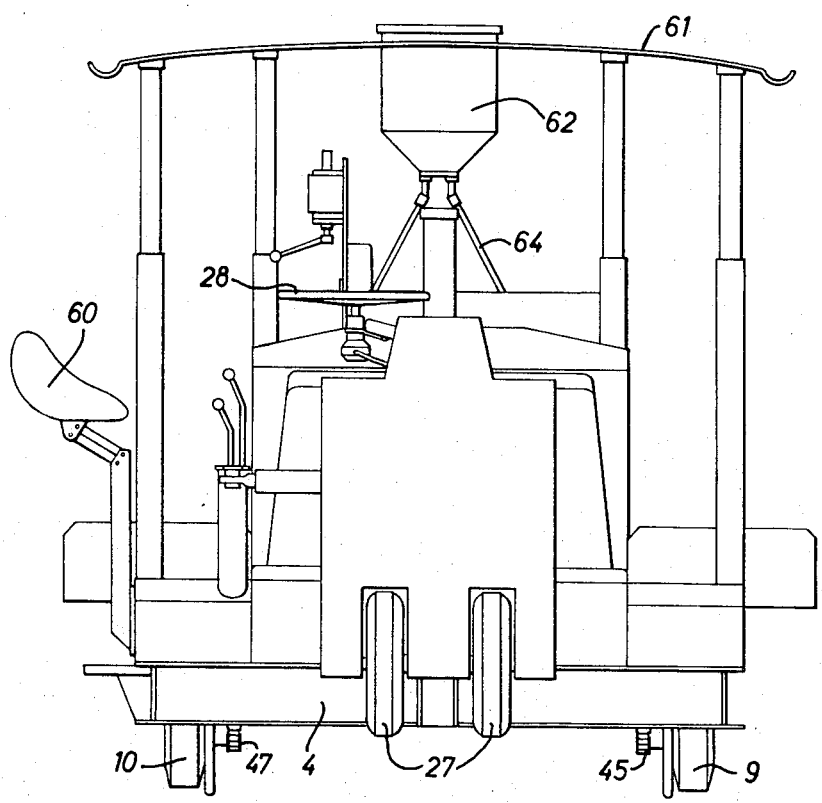
FIGURE 4 is an end elevation of the apparatus illustrated in FIGURE 1.

Referring to FIGURE 2, the mechanism for raising and lowering the guide wheels comprises an hydraulic jack 26 pivotally mounted at 13 to the chassis, the piston-rod 15 of the jack being pivotally secured at 16 to one arm 14 of a bell-crank 17. The other arm 18 of the bell-crank is provided at its free end with a pivotally mounted guide wheel 11 or 12.

Mounted on the chassis adjacent the first pair of drive wheels is a cross-beam 20 which is pivotable about its centre 21 in a horizontal plane to a limited extent, for example 12°, and which is capable of limited endwise movement. The cross-beam is constantly urged into its central or rest position by means of tension springs 22 which each have one end secured to the cross-beam and their other end secured to the chassis. In addition the cross-beam is capable of being raised away from the chassis by means of an hydraulic jack 24, the lower end of which is secured to the chassis and the piston rod of which bears against the underside of the cross-beam.

Mounted at one end of the chassis are a pair of retractable steering wheels 27 which are shown in FIGURE 1 in their retracted position. The steering wheels are extendable by means of an hydraulic jack to raise the flanged driving wheels 9 and 10 clear of the ground. The steering wheels are pivoted in order to steer the tractor when it is in use as a road tractor by means of a hand wheel 28 which operates through a linkage 29, 30 and 31 and through a hydrostatic system whereby the effort applied by the operator to the hand wheel is magnified.

Reference numeral 35 designates a prime mover, in this case a horizontally opposed four cylinder internal combustion engine of 1200 cc. capacity, which serves to drive a gear box 34 which may for example be provided with three forward and three reverse gears, through a clutch mechanism 33 and a differential. The gear box is provided with a pair of power take-off shafts 36 and 37, the free ends of which serve to drive pairs of sprockets 40, 41 and 42, 43 respectively. These sprockets in association with corresponding sprockets 44, 45 and 46, 47 and by means of chains 48, 49 and 50, 51 serve to drive the two pairs of drive wheels 5, 6 and 9, 10.

The prime mover 35 is also effective to drive a hydraulic pump 55 which may for example be a vane pump or a swash-plate pump. The pump 55 provides the power necessary for the various jacks employed by the tractor for raising the cross-beam, lowering the guide wheels, actuating the steering wheels etc.

Mounted beneath the chassis and at a position beneath the centre of gravity of the vehicle is a lift footing 56 which in FIGURE 1 is shown in its retracted position. The lift footing is extendable by means of an hydraulic jack so that in its extended position it lifts the tractor clear of the ground. When the vehicle is clear of the ground in may be pivoted on the lift footing either manually or by power means, for the purpose hereinafter described.

As illustrated in FIGURE 1 the vehicle may also be provided with a seat 60 for the operator and a roof 61 to provide some degree of protection from the weather. It will be appreciated however that it would be a relatively simple matter to provide an enclosed cab for the operator should operating conditions so demand.

As shown in FIGURE 1 the vehicle is also provided with a sand receptacle 62 which, by means of pipes 63 and 64, is adapted to spray sand on the rails in order to obtain increased traction if necessary.

It is envisaged that the vehicle will normally be used on rails for shunting or spotting rail cars in a goods siding. In order to couple the tractor to a rail car, the tractor is driven to a position so that the cross-beam 20 is immediately below the rail car buffers. The cross-beam is then raised on its jack to engage the buffers in grooves provided in the cross-beam. The vehicle then assumes part of the weight of the rail car, by raising the rail car off its springs. The tractive effort of the tractor is thus increased, owing to the transference of weight from the rail car to the tractor. However it is possible to couple the tractor by means of known automatic coupling devices to rail cars. In this case an automatic coupler of any desired kind is substituted for the cross-beam. When the coupler is connected with the coupler on the rail car, the jack 24 is raised in order to transfer part of the weight of the rail car to the tractor. In addition it is possible to connect the tractor to a rail car by means of a towing bar which engages the towing hook of the rail car and which is pivotally secured to the tractor preferably by means of a shackle pin. It is also possible to ballast the tractor in order to increase the tractive adhesive of the tractor, but if rubber tyres are employed, as is preferred, then this usually is not necessary.

When it is desired to remove the vehicle from the rails, for instance when the tractor is to be used to tow road trailers, the lift footing is first raised to lift the vehicle clear of the rails and then the vehicle is turned on the lift footing so that it lies at right-angles to the rails.

The steering wheels are then lowered and the lift footing retracted so that the tractor rests on the ground with the first pair of driving wheels outside the rails, the flanged driving wheels raised from the ground and the steering wheels on the opposite side of the rails. The tractor is then backed, that is to say driven in a direction with the steering wheels trailing, until the steering wheels rest against the outside of one rail. The steering wheels are then retracted and the tractor backed further until the flanged driving wheels contact the inside of the other rail. The steering wheels are again extended and the tractor backed still further until the steering wheels contact the inside of the said other rail. The steering wheels are again retracted and the tractor is backed away from the rails on its four driving wheels. The steering wheels can then be extended once more so that the tractor can be steered and used for example as a road tractor.

If desired attachments can be provided for adapting the vehicle for use as, for example, a crane. Additionally or alternatively the tractor may be provided with a pair of pallete forks, preferably pivotally secured to the chassis adjacent the steering wheels. The forks can then be folded upwards when not in use. The tractor may also be provided with at least one pair of brakes perferably hydraulically operated and perferably of substantial size. It will be appreciated that these brakes usually provide the entire retarding force, disregarding friction, when shunting a train of goods waggons, as it is unusual for the rail car brakes to be coupled-up when the cars are in a goods siding.

I claim:
1. A combination ground and rail vehicle, comprising:
 (a) a frame;
 (b) a first pair of wheels rotatably mounted on said frame, said wheels being adapted to rollingly engage either the ground or a pair of parallel rails;
 (c) first guide means associated with said first pair of wheels and engageable with said rails for maintaining said wheels in rolling engagement with said rails;
 (d) motor means adapted to rotate said first pair of wheels;
 (e) a second pair of wheels rotatably mounted on said frame, said wheels being adapted to rollingly engage a pair of parallel rails;
 (f) second guide means associated with said second pair of wheels and engageable with said rails for maintaining said second wheels in rolling engagement with said rails;
 (g) a third pair of steerable and rotatable wheels;
 (h) means mounting said third pair of wheels on said frame for vertical movement with respect thereto between an upper position above a plane defined by the lowermost points on said first and second pairs of wheels, and lower position wherein said third pair of wheels extends below said plane, said second wheels being located between said first and third wheels;
 (i) lift means mounted on said frame and having a pivotable support member vertically movable between a first position above said plane and a second position below said plane for supporting the entire vehicle spaced from the ground;
 (j) said vehicle being supported only on said first and second pairs of wheels when in rolling engagement with said rails and being supported only on said first and third pairs of wheels when in rolling engagement with the ground.

2. A vehicle according to claim 1 capable of partially supporting and capable of moving a second vehicle, including:
 (a) a cross-beam pivotally mounted on said frame for movement in a horizontal plane;
 (b) resilient means biasing said cross-beam into an intermediate position substantially transverse to the axis of said first pair of wheels; and
 (c) fluid-actuated power means mounted on said frame and coupled to said cross-beam for vertically extending and retracting same.

3. A vehicle according to claim 2, wherein said first pair of wheels is mounted adjacent one end of said vehicle, said second and third pairs of wheels are mounted near the other end of said vehicle;
 (a) said cross-beam being adapted to be positioned under a portion of the second vehicle with said cross-beam being extended by said power means to engage the second vehicle and thus transfer a portion of the weight thereof onto the cross-beam.

4. A vehicle according to claim 1, wherein:
 (a) said first guide means comprises a pair of guide rollers vertically movably mounted upon said frame adjacent said first pair of wheels; and (b) actuating means operatively connected to said guide rollers for effecting said vertical movement thereof.

5. A vehicle according to claim 4, wherein:
(a) the guide rollers are each rotatably mounted on a bell-crank, said bell-cranks being pivotally mounted on said frame;
(b) wherein said actuating means comprise fluid pressure actuated and reciprocable power means mounted on said frame and connected to said bell-cranks for oscillating said guide rollers between extended and retracted positions.

6. A vehicle according to claim 1, wherein:
(a) said support member is spaced from said first pair of wheels a distance greater than half the distance between said parallel rails.

7. A vehicle according to claim 1, wherein:
(a) said support member is spaced from said second pair of wheels a distance less than half the distance between said parallel rails.

8. A combination ground and rail vehicle, comprising:
(a) a frame;
(b) a set of flanged drivng wheels mounted on said frame;
(c) a set of unflanged driving wheels mounted on said frame;
(d) a retractable guide wheel mounted adjacent each unflanged driving wheel;
(e) means for extending and retracting each guide wheel whereby said guide wheels are lifted off the ground when in the retracted position, said means comprising a fluid-actuated cylinder;
(f) a pair of retractable and steerable wheels mounted adjacent the flanged driving wheels;
(g) means for retracting and extending the steerable wheels whereby extension of said steering wheels into contact with the ground causes said flanged driving wheels to be lifted clear of the ground, said means comprising a fluid-actuated cylinder;
(h) lift means mounted on the frame and including a pivotal lifting foot extendable below the frame by means of a fluid-actuated cylinder into engagement with the ground whereby the two sets of driving wheels are vertically lifted out of driving engagement with either the ground or the rails;
(i) a cross-beam mounted on said frame for limited rotational movement in a horizontal plane, and a fluid-actuated cylinder mounted on said frame for extending the cross-beam upwardly away from said frame;
(j) resilient means acting on said cross-beam for permitting limited endwise movement thereof;
(k) said vehicle being supported only on said set of flanged driving wheels and said set of unflanged driving wheels when in rolling engagement with a pair of rail members and being supported only on said set of unflanged driving wheels and said pair of steerable wheels when in rolling engagement with the ground.

9. A vehicle according to claim 8, including:
(a) a prime mover means mounted on said frame and interconnected to said driving wheels for driving same, said prime mover means including a multiple-speed transmission and a clutch therein; and
(b) pump means connected to and driven by said prime mover means for providing pressurized fluid for said fluid-actuated cylinders.

References Cited
UNITED STATES PATENTS

| | | | |
|---|---|---|---|
| 1,863,575 | 6/1932 | Moncrieff et al. | 105—215 |
| 1,881,045 | 10/1932 | Chapin et al. | 105—215 X |
| 2,718,197 | 9/1955 | Bock et al. | 105—215 |
| 2,721,522 | 10/1955 | Ames | 105—73 |
| 3,108,513 | 10/1963 | Koshobu | 105—215 X |
| 3,130,686 | 4/1964 | Fiechter et al. | 105—215 |
| 3,182,604 | 5/1965 | Foxx et al. | 105—177 |
| 3,198,137 | 8/1965 | White | 105—26 |
| 3,249,067 | 5/1966 | Keller | 105—215 |

ARTHUR L. LA POINT, *Primary Examiner.*

H. BELTRAN, *Assistant Examiner.*